United States Patent
Ahmadzadeh et al.

(10) Patent No.: US 10,158,998 B2
(45) Date of Patent: Dec. 18, 2018

(54) NETWORK PATH PROBING USING AVAILABLE NETWORK CONNECTIONS

(71) Applicant: QUALCOMM Incorporated, San Diego, CA (US)

(72) Inventors: Seyed Ali Ahmadzadeh, San Jose, CA (US); Saumitra Mohan Das, San Jose, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 15/187,837

(22) Filed: Jun. 21, 2016

(65) Prior Publication Data

US 2017/0366978 A1 Dec. 21, 2017

(51) Int. Cl.
*H04W 12/12* (2009.01)
*H04L 29/12* (2006.01)
(Continued)

(52) U.S. Cl.
CPC ......... *H04W 12/12* (2013.01); *H04L 61/2571* (2013.01); *H04L 61/2575* (2013.01);
(Continued)

(58) Field of Classification Search
None
See application file for complete search history.

(56) References Cited

U.S. PATENT DOCUMENTS

| 7,706,278 B2 * | 4/2010 | Wing | H04L 43/026 370/236 |
| 8,074,279 B1 * | 12/2011 | Lin | H04W 12/12 709/243 |

(Continued)

FOREIGN PATENT DOCUMENTS

| CN | 102204170 A | 9/2011 |
| KR | 20150028139 A | 3/2015 |

OTHER PUBLICATIONS

Blancher C: "About Good Usage of Traceroute", Oct. 1, 2003, XP055062386, Retrieved from the Internet: URL: http://sid.rstack.orgjarticles/0309_MISC Traceroute en.pdf, [retrieved on May 8, 2013], 6 pages.

(Continued)

*Primary Examiner* — William J. Goodchild
(74) *Attorney, Agent, or Firm* — Jae-Hee Choi; The Marbury Law Group

(57) ABSTRACT

Various embodiments provide methods, devices, and non-transitory processor-readable storage media enabling network path probing with a communications device by sending probes via a network connection to a STUN server and receiving probe replies. The communications device may increment a counter and transmit a test probe configured to be dropped at the first access point (NAT) causing all subsequent NATs to release their IP/port mappings. The communications device may send another probe to the STUN server and receive a probe reply. The communications device may compare the first and second probe replies (Continued)

to determine whether the final IP addresses within the network path match. By continuously incrementing the counter and querying access points, the communications device may determine the number of access points lay along any given network path. The presence of addition or unexpected numbers of NAT Servers may indicate the presence of a rogue access point.

26 Claims, 7 Drawing Sheets

(51) Int. Cl.
*H04L 29/06* (2006.01)
*H04W 48/16* (2009.01)
*H04L 12/26* (2006.01)

(52) U.S. Cl.
CPC ...... *H04L 63/1425* (2013.01); *H04L 63/1466* (2013.01); *H04W 48/16* (2013.01); *H04L 43/10* (2013.01); *H04L 61/2503* (2013.01)

(56) References Cited

U.S. PATENT DOCUMENTS

| | | | |
|---|---|---|---|
| 8,844,041 B1* | 9/2014 | Kienzle | H04L 41/12 709/224 |
| 9,003,527 B2* | 4/2015 | Bhagwat | H04L 43/00 726/23 |
| 2007/0298720 A1* | 12/2007 | Wolman | H04L 63/1408 455/66.1 |
| 2008/0151764 A1* | 6/2008 | Wing | H04L 41/12 370/248 |

OTHER PUBLICATIONS

International Search Report and Written Opinion—PCT/US2017/033598—ISA/EPO—dated Jul. 10, 2017.
Malkin G., et al., "Traceroute Using an IP Option; rfc1393.txt", Network Working Group, RFC 1717, Internet Society (ISOC), Jan. 1, 1993, XP015007180, 7 pages.
Takeda Y., "Symmetric NAT Traversal using STUN", Panasonic Communications Research Laboratory, Internet Engineering Task Force, ISOC, Jun. 1, 2003, XP015005445, 24 pages.

* cited by examiner

NETWORK PATH PROBING USING AVAILABLE NETWORK CONNECTIONS

BACKGROUND

Network based observations are among the most effective methods to obtain information about network topology and in-path devices. Network probing is also considered very effective for rogue network device detection. Current network based probing methods use dedicated servers to act as the probe generator or the probe sink. For example, in current network based probing methods, a probing client device often transmits a probe to a dedicated server. Thus, in current network based probing methods, the probing client device must know the dedicated server information ahead of time to initiate the connection with the dedicated server and the dedicated server needs to be up and running for the probe to be completed. Thus, current approaches for network probing are not scalable and depend on network access rules to enable network probing. Additionally, in current network based probing methods, rogue devices (e.g., rogue access points) can learn about the server and thwart the probing process using the same dedicated server information. For example, in current network based probing methods, each probe is often addressed to the same server address, thereby allowing probes to be identified and handled by rogue devices to thwart the probing process. Methods are needed for circumventing a rogue device's ability absorb probe packets.

SUMMARY

Various embodiments may include methods, devices for implementing the methods, and non-transitory processor-readable storage media including instructions configured to cause a processor to execute operations of the methods for network probing by a communications device. Various embodiments may include transmitting a first probe addressed to a Simple Traversal Utilities for NATs (STUN) server from the communications device via a network connection to a first Network Address Translator (NAT), and receiving a first probe reply from the STUN server. Various embodiments may further include incrementing a probe timeout counter, and transmitting a first test probe including a current value of the probe timeout counter via the network connection, in which the first test probe may be configured to cause the first NAT to maintain an active mapping and drop the first test probe. Various embodiments may further include transmitting a second probe addressed to the STUN server from the communications device via the network connection, receiving a second probe reply from the STUN server, and comparing the first probe reply to the second probe reply.

In some embodiments, the first probe and the second probe may include a communications device Internet Protocol (IP) address, a communications device communications port number, a STUN server IP address, a STUN server communications port number, and a communications used to transmit the probe.

Some embodiments may include determining whether information contained within the first probe reply matches information contained within the second probe reply using a result of comparing the first probe reply and the second probe reply. Such embodiments may further include, in response to determining that the information contained within the first probe reply and the information contained within the second probe reply do not match, incrementing the probe timeout counter, and transmitting a second test probe including the incremented value of the probe timeout counter via the network connection, in which the second test probe may be configured to cause the first NAT and a second NAT to maintain the active mapping and the second NAT to drop the second test probe. Such embodiments may further include transmitting a third probe addressed to the STUN server from the communications device via the network connection, receiving a third probe reply from the STUN server, and comparing the third probe reply to the second probe reply. Such embodiments may further include determining that the number of NATs in a network path is equal to the current value of the probe timeout counter in response to determining that the information contained within the first probe reply matches information contained within the second probe reply. Such embodiments may further include determining that a rogue access point is present in the network path in response to determining that the determined number of NATs in the network path does not match a predetermined number of NATs. In such embodiments, the information contained within the first probe reply may include a final IP address and port number, and the information contained within the second probe reply may include a second final IP address and port number.

Some embodiments may include initializing the probe timeout counter to zero prior to transmitting the first probe. In such embodiments, the IP addresses and local ports of multiple computing devices maybe mapped to the same global IP address and global port of the first NAT.

Further embodiments may include a communications device having a transceiver and a processor configured with processor-executable instructions to perform operations of the methods summarized above. Further embodiments may include a communications device having means for performing functions of the methods summarized above. Further embodiments may include a non-transitory processor-readable storage medium on which is stored processor-executable instructions configured to cause a processor of a communications device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
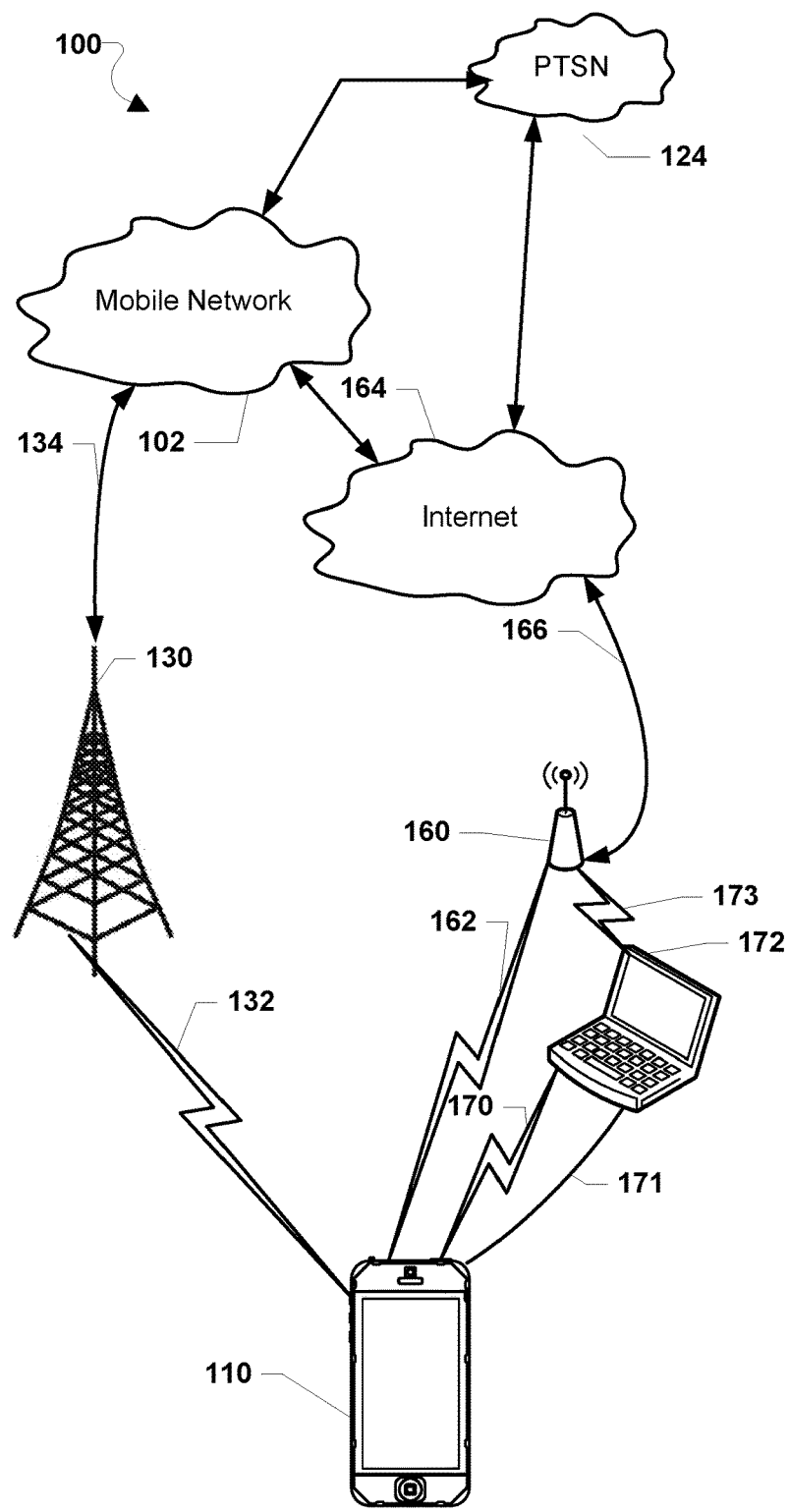
FIG. 1 is a communications system block diagram of a network suitable for use with the various embodiments.

Various embodiments and implementations will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

The terms "communications device" and "computing device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor, memory, and circuitry for establishing wireless communications pathways and transmitting/receiving data via wireless communications pathways. The various aspects may be useful in communications devices, such as mobile communications devices (e.g., smart phones), and so such devices are referred to in the descriptions of various embodiments. However, the embodiments may be useful in any electronic devices capable of establishing two different network connections at the same time.

Communications devices, such as mobile communications devices (e.g., smart phones), may use a variety of interface technologies, such as wired interface technologies (e.g., Universal Serial Bus (USB) connections, etc.) and/or air interface technologies (also known as radio access technologies)(e.g., Third Generation (3G), Fourth Generation (4G), Long Term Evolution (LTE), Edge, Bluetooth, Wi-Fi, satellite, etc.). Communications devices may establish connections to a network, such as the Internet, via more than one of these interface technologies at the same time (e.g., simultaneously). For example, a mobile communications device may establish an LTE network connection to the Internet via a cellular tower or a base station at the same time that the mobile communications device may establish a wireless local area network (WLAN) network connection (e.g., a Wi-Fi network connection) to an Internet connected Wi-Fi access point. The capability of communications devices to establish two different network connections at the same time may enable solutions for wired and wireless communications devices for network probing by determining a number of Network Address Translators within a network access path.

As used herein, the terms "NAT" and "access point" may be used interchangeably to mean any network traffic path access point running network access translation services. Network Address Translators (NAT) are network access points employing methods of mapping the Internet protocol (IP) address spaces of one or more communications devices (i.e., a first IP address space) to another, common IP address (i.e., a shared IP address space) such as a public IP address assigned by an Internet Service Provider (ISP). Each network flow is identified by its 5-tuple (i.e., Source IP, Source Port, Destination IP, Destination Port, Protocol). Each NAT in a network traffic path may maintain, in a translation table, a record of the unique mapping of individual IP addresses and ports to the global/common IP address space and port. Information regarding destination IP address and port may be stored in association with the source mapping. Each packet contains header information including a source IP address, source port, destination IP address, and destination port. The NAT may modify the IP packets headers of data flows from different sources as the packets traverse the access point. As packets flow outward from network computing devices through the NAT, IP packet headers may be altered to provide some anonymity to the sending device, while return data flows traversing the access point may have their IP packet headers mapped to the original source device based on the NAT's unique mapping. Packets transmitted from within the local network may appear to the exterior observer to originate from and return to the access point rather than the local communications devices. The IP address space of multiple computing devices on a local network may thus be hidden from the Internet.

Mappings produced by each NAT in a network traffic path may expire after a period of inactivity. Each NAT may remove the IP address translation for inactive traffic flows from a translation table. The short duration of mapping expiration may result in the frequent release and renewal of IP address mappings as communications devices end and begin communications with new hosts. For each NAT lying in a network traffic path, there is a separate IP mapping with the global/common IP address (e.g., public IP address) of the previous NAT acting as the source IP for the current NAT. Each mapping may have a separate expiration duration after which a respective mapping may be released. Because each NAT requires regular data flow activity to stay active, the more NATs present in a network traffic path, the more power resources are needed by the communications device to maintain the active data flow mappings.

Communications devices lying "behind" the NAT, may execute applications that request the public IP address to which the communications device is mapped. The public address is discoverable via a server implementing Session Traversal Utilities for NATs (STUN) protocol. STUN servers may enable communications devices to determine the global IP address, global port, and expiration duration for the NAT mappings. Information provided by a STUN server to a requesting communications device may also be used to determine NAT setup/model, such as full cone, restricted cone, port restricted cone, or symmetric. Further, the STUN server report may provide information that may be used to determine the NAT's port assignment method such as random, sequential, or source port related.

A STUN server positioned on the public side of the last NAT in a network traffic path may receive a request packet (referred to as a "probe") from a communications device lying behind the NAT, and may return the public IP address of the last NAT in the network traffic path. Thus, any communications device on the local network may transmit a probe to a STUN server and receive the communications device's public IP address and port in return.

Rogue access points are unauthorized network access points that may pose serious security risks. If installed by a malicious actor (attacker), the access point may provide access to network data flows, thereby enabling the attacker to execute a variety of network attacks that modify content sent to victims, forge digital certificates and public keys, domain name server (DNS) spoofing, password interception and recordation, and the like. Thus, the introduction of undetected rogue access points into a network traffic path can present serious privacy and other risks. The number of attack vectors continues to increase as communications device gain more connectivity options (e.g., softAP, femtocells, merged wireless wide-area network (WWAN) and WiFi). Further, the presence of unauthorized NATs in a local network creates additional strain on the power resources of the networked communications devices, which must expend energy maintaining an active mapping on the rogue access point as well as the legitimate NATs.

Various embodiments provide methods, devices, and non-transitory processor-readable storage media enabling network probing with a communications device by leveraging normal functionality of network connections through Network Address Translators (NATs). Various embodiments include the communications device establishing a network connection via a first NAT, and transmitting a probe addressed to a Simple Traversal of UDP (User Datagram Protocol) through NAT (STUN) server over the network connection. The first NAT may be referred to as the "near NAT" based on being the first NAT in the network traffic path to the communications device. The probe sent to the STUN server causes each NAT in the communication path to the STUN server to set up a new network address translation mapping for the communications device. In response to the probe, the STUN server will send a probe reply to the communications device on the same local network connection. Upon receiving the probe reply from the STUN server, the communications device may increment a probe timeout counter to "1" for use in the next round of probing. The communications device may then transmit a test probe (referred to as a "first test probe") via the network connection, with the first test probe including the probe timeout counter. Setting the test probe timeout counter to "1" causes the first NAT to maintain an active address translation mapping for the communications device but drop the test probe packets. In dropping test probe packets, the NAT may refrain from transmitting the test probe packets to the next node in the chain of nodes to the STUN server. Since NATs upstream from the first NAT do not receive test probe packets, those NATs will drop or delete the address translation mapping for the communications device. Thus, at this stage, only the first NAT in the connections to the STUN server will maintain an active address translation mapping for the communications device.

The communications device may then transmit a second probe addressed to the STUN server via the network connection through the first NAT. As the second probe is relayed to each NAT positioned progressively further along the network traffic path from the first NAT, a new address translation mapping will be generated. The STUN server once again sends back a probe reply via the link through all of the NATs to the communications device. The communications device may receive the second probe reply from the STUN server. The communications device may then compare the port and IP address in the first probe reply to the port and IP address in the second probe reply to determine whether the IP address and port number reported in the first probe reply matches the IP address and port number reported in the second probe reply. If the port and IP addresses associated with the first and second probe replies match, the communications device is informed that there is just one NAT between the communications device and the STUN server.

If the IP addresses associated with the first and second probe replies do not match, this indicates that there are additional NATs in the network traffic path (i.e., at least one NAT beyond the first NAT). In that case, the communications device may increment the probe timeout counter again (this time to "2") for use in the next round of probing. The communications device may then transmit a second test probe via the network connection, with the second test probe including the probe timeout counter. Setting the probe timeout counter to "2" causes both the first NAT and the next NAT in the communication path to the STUN server to maintain an active address translation mapping for the communications device but drop the test probe packets. In dropping test probe packets, the NAT may delete the received packet data or simply refrain from transmitting the test probe packets to the next node in the chain of nodes to the STUN server. Since NATs positioned progressively further along the network traffic path than the second NAT do not receive test probe packets, those NATs will drop or delete the address translation mapping for the traffic flow. Thus, at this stage, only the first and second NAT in the connections to the STUN server will maintain an active address translation mapping for the communications device.

The communications device may then transmit a third probe addressed to the STUN server via the network connection through the first NAT. As the second probe is relayed to each NAT positioned progressively further along the network traffic path from the second NAT, a new address translation mapping will be generated by each NAT since the previous address translation mapping was deleted. The STUN server once again sends back a probe reply (a third probe reply) via the link through all of the NATs to the communications device. The communications device may receive the third probe reply from the STUN server. The communications device may then compare the port and IP address in the second probe reply to the port and IP address in the third probe reply to determine whether the port and IP address associated with the second probe reply matches the port and IP address associated with the third probe reply. If the port and IP addresses associated with the first and second probe replies match, the communications device is informed that there are two NATs between the communications device and the STUN server. Thus, the value in the probe timeout counter equals the number of NATs in the communication path to the STUN server.

If the port and IP addresses associated with the second and third probe replies do not match, this indicates that there are additional NATs in the network traffic path (i.e., at least one NAT beyond the first NAT). In that case, the communications device may repeat the process of incrementing the probe timeout counter, sending another probe including that counter to cause the NATs equal to that counter value to maintain an address translation mapping for the server while subsequent NATs deleted their address translation mapping, and then sending another probe to the STUN server. This probing process may be repeated a number of times until two probe replies contain matching port and IP addresses. The communications device then determines that the number of NATs in the path to the STUN server is equal to the value of the probe timeout counter.

Legitimate connections often use NATs to provide service to multiple data flows. Rogue access points may use legitimate network connections as a backhaul but must run a separate NAT service in order to map to legitimate public flows. Network designers generally keep the number of NATs to a minimum to optimize network performance, making changes in the number of NATs rare events. User devices may store a predetermined number of NATs operating in a given network traffic path. Determining the number of NATs within a network traffic path according to various embodiments may enable the detection of redundant NATs, thereby indicating the presence of a rogue access point.

Various embodiments may include communications devices having a probe manager running on a processor of a communications device, such as on the application processor of communications device, on a dedicated processor of the communications device, on a modem processor of the communications device, or on any one or more processors of the communications device. The probe manager may send and receive probes and probe replies to/from a network as summarized above and described in more detail below.

The probe manager may generate the probes configured to enable the probe manager to determine the number of NATs operating in a network traffic path according to various embodiments. The one or more probes may be addressed to a known STUN server lying on the "public side" of the network traffic path. The one or more probes may have varying contents, such as different headers and/or different payloads (e.g., random numbers inserted into the header and/or payload). The probe manager may send and receive the one or more probes addressed to the STUN server via a network. The probe manager may track the probe timeout counter (i.e., NAT counter), a number of probes sent, and any received probe replies. The probe manager may establish a network connection via a first NAT/access point and associate the communications device with the first NAT.

The probe addressed to the STUN server may be sent from the communications device via the network connection. The probe may be routed from the network connection to the STUN server via one or more access points running NAT services operating within the network traffic path. The communications device may send the probe to the STUN server. The probe may contain the 5-tuple (Source IP, Source Port, destination IP, destination Port, Protocol) identifying the transmitting communications device and the target destination server. As the probe passes along the network traffic path, the first NAT (i.e., near NAT) performs a first address translation, as will each subsequent NAT node along the network traffic path, including the farthest NAT node from the communications device (the "far NAT").

The probe manager may receive and record a probe reply sent by the STUN server to the communications device. The probe reply may include the port and IP address information for the final NAT in the network traffic path.

The probe manager may set a "probe timeout" counter to 1 and may then send a test probe to the first NAT. The first NAT may receive the test probe, determine that the local flow is still active, and maintain the NAT mapping for the local flow. However, because the probe timeout counter is equal to one, and the first NAT is one hop from the communications device, the first NAT will drop the test probe packets. As a result, the subsequent NATs in the network traffic path will not receive the test probe and will determine that the local flow is inactive, and therefore will release their respective NAT mapping for their respective NATs.

The probe manager of the communications device may then send another probe to the STUN server. The NAT mapping for the first NAT (i.e., near NAT) remains active, but new mappings must be generated as the probe packets traverse each additional NAT. As with the first probe, the STUN server sends a probe reply to the communications device including the port and IP address information for the final NAT in the network traffic path. The probe manager may compare this port and IP information (i.e., the second probe reply) to the previously received information (i.e., the first probe reply). If the information is different, then another unaccounted for NAT node exists in the network traffic path (i.e., more than just the first NAT node).

The probe manager may increment the probe timeout counter to 2 and send another test probe to the first NAT. The first NAT receives the test probe, determines that the local flow is still active, and maintains the NAT mapping for the local flow. Because the value of the probe timeout counter is greater than the first NAT node's position in the network traffic flow, the first NAT relays the test probe to the next NAT. According to standard network protocols, each NAT decrements the probe timeout counter by 1 because the NAT represents one hop in the communication path, and if the counter is greater than 0, the NAT transmits the packet along to the next node in the communication path. The next NAT determines that the local flow is still active by receiving the test probe packet, maintains the previously generated network address translation mapping. The next NAT then decrements the counter by 1, transmits the test probe packet along to the next node in the communication path if the probe timeout counter is greater than 0, and drops the test probe packets (i.e., does not transmit the packets on) if the value of the probe timeout counter is 0. Thus, NATs positioned further along the network traffic path will not receive the test probe once a NAT finds the probe timeout counter is "0" after decrementing. When NATs positioned further along the network traffic path fail to receive further packets, the NATs will determine that the local flow is inactive, and therefore will release (i.e., delete) their respective network address translation mapping for the traffic flow between the communications device and the STUN server.

The probe manager may again increment the probe timeout counter and send a probe to the STUN server and may receive another probe reply containing the final NAT port and IP address. The communications device may compare this information against the last received final NAT port and IP address (i.e., previous probe reply) to determine if a change has occurred. If there is no difference between the two sets of received information, then the last accounted for NAT is the last hop (i.e., the Far NAT). If there is a difference between the two sets of received information, then the probe manager of the communications device may continue incrementing the probe timeout counter current value and sending queries until the total number of NATs lying within the network traffic path is determined.

Thus in various embodiments, the probe manager may maintain a link to a known NAT node by sending test probes with the probe timeout counter in each probe set to the number of hops in the network path necessary for the packet to reach the known NAT node. This causes subsequent NAT nodes lying beyond the known node in the network traffic path to release their NAT mappings. The probe manager may then send another probe to a STUN server, thereby requiring NAT nodes beyond the known NAT node to generate a new NAT mapping. The probe manager may then compare a received final NAT IP and port against a previously received set of final NAT information to determine whether there are unaccounted-for NAT services operating within a network traffic path. Various embodiments may enable the probe manager to count NAT nodes/services by incrementing the probe timeout counter with each probe to the STUN server until the returned final NAT port and IP address received from the STUN server match the information received in the previous probe reply. Various embodiments may enable the probe manager to compare the determined (i.e., counted) number of NAT nodes/services operating in a network traffic path against a pre-determined or expected number of NAT nodes/services to detect whether a new (i.e., potential rogue) NAT node/services has been added in the traffic path. If the number of NAT nodes counted through the iterative packet transmission process does not match an expected number of NAT nodes (e.g., a value provided by a network administrator), then an unaccounted for NAT is present within the network access path and is likely a rogue access point.

Various embodiments may be implemented within a variety of communications systems 100, an example of which is illustrated in FIG. 1. A mobile network 102 typically includes a plurality of cellular base stations (e.g., a first base station 130. The network 102 may also be referred to by those of skill in the art as access networks, radio access networks, base station subsystems (BSSs), Universal Mobile Telecommunications Systems (UMTS) Terrestrial Radio Access Networks (UTRANs), etc. The network 102 may use the same or different wireless interface technologies and/or physical layers. In an embodiment, the base stations 130 may be controlled by one or more base station controllers (BSCs). Alternate network configurations may also be used and the embodiments are not limited to the configuration illustrated.

A first communications device 110 may be in communications with the mobile network 102 through a cellular connection 132 to the first base station 130. The first base station 130 may be in communications with the mobile network 102 over a wired connection 134.

The cellular connection 132 may be made through two-way wireless communications links, such as Global System for Mobile Communications (GSM), UMTS (e.g., Long Term Evolution (LTE)), Frequency Division Multiple Access (FDMA), Time Division Multiple Access (TDMA), Code Division Multiple Access (CDMA) (e.g., CDMA 1100 1x), WCDMA, Personal Communications (PCS), Third Generation (3G), Fourth Generation (4G), Fifth Generation (5G), or other mobile communications technologies. In various embodiments, the communications device 110 may access network 102 after camping on cells managed by the base station 130.

The network 102 may be interconnected by public switched telephone network (PSTN) 124 and/or the Internet 164, across which the network 102 may route various incoming and outgoing communications to/from the communications device 110.

In some embodiments, the first communications device 110 may establish a wireless connection 162 with a wireless access point 160, such as over a WLAN connection (e.g., a Wi-Fi connection). In some embodiments, the first communications device 110 may establish a wireless connection 170 (e.g., a personal area network connection, such as a Bluetooth connection) and/or wired connection 171 (e.g., a USB connection) with a second communications device 172. The second communications device 172 may be configured to establish a wireless connection 173 with the wireless access point 160, such as over a WLAN connection (e.g., a Wi-Fi connection). The wireless access point 160 may be configured to connect to the Internet 164 or another network over the wired connection 166, such as via one or more modem and router. Incoming and outgoing communications may be routed across the Internet 164 to/from the communications device 110 via the connections 162, 170, and/or 171. In some embodiments, the access point 160 may be configured to run NAT services mapping local network addresses of the first communications device 110 and the second communications device 172 to a public IP address and port prior to routing respective data flows to Internet 164.

Figure 2:
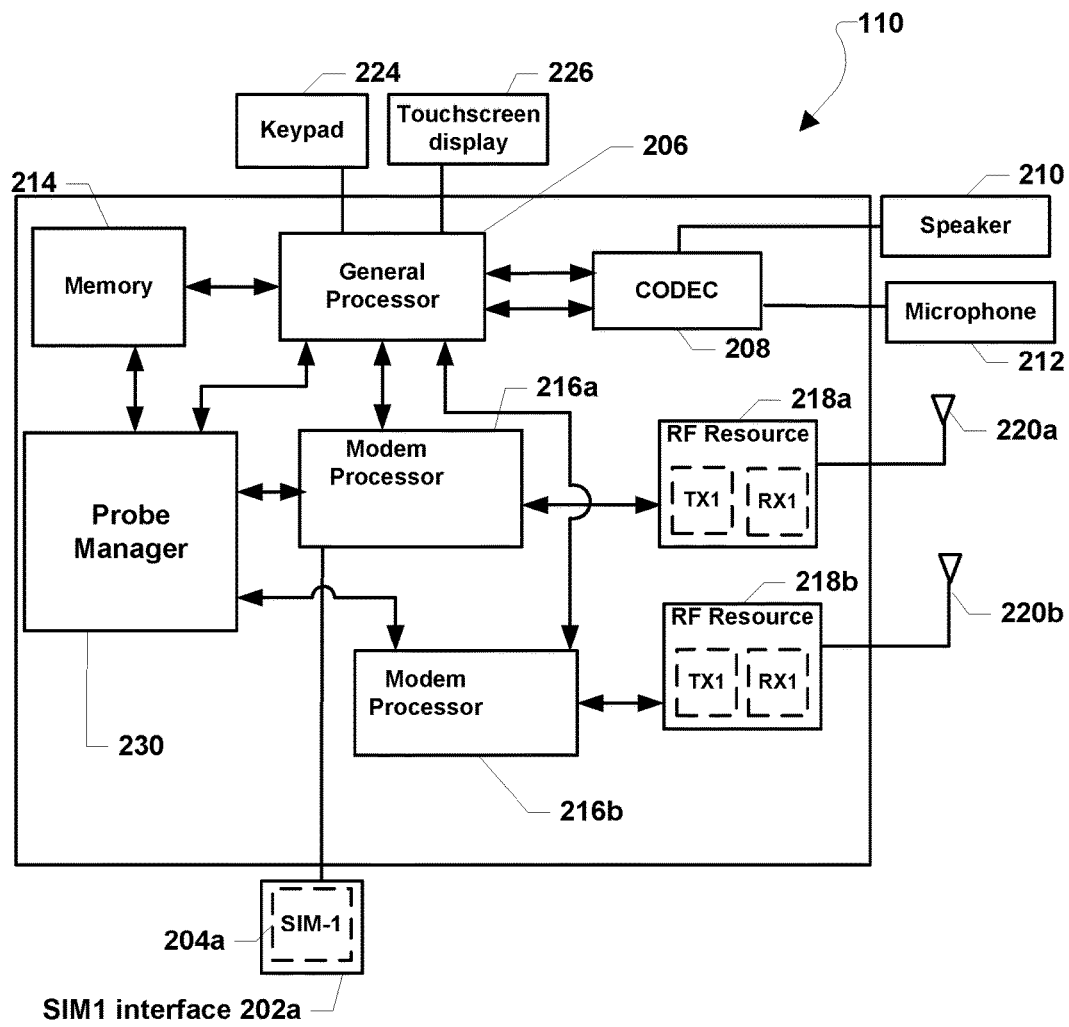
FIG. 2 is a block diagram illustrating a communications device according to various embodiments.

FIG. 2 is a functional block diagram of an example communications device 110 that is suitable for implementing various embodiments. With reference to FIGS. 1-2, the communications device 110 may include a first subscriber identity module (SIM) interface 202a, which may receive a first identity module SIM 204a that is associated with a first subscription.

A SIM, in various embodiments, may be a Universal Integrated Circuit Card (UICC) that is configured with SIM and/or Universal SIM (USIM) applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the communications device 110 (e.g., memory 214), and thus need not be a separate or removable circuit, chip or card.

The communications device 110 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communications data though a corresponding radio frequency (RF) resource chain.

The memory 214 may store an operating system (OS), as well as user application software and executable instructions. The memory 214 may also store application data, such as an array data structure.

The general processor 206 and the memory 214 may each be coupled to at least two modem processors 216a and 216b. A first RF resource chain may include the first modem processor 216a, which may perform baseband/modem functions for communicating with/controlling an interface technology, and may include one or more amplifiers and radios, referred to generally herein as RF resources (e.g., RF resources 218a). The SIM 204a in the communications device 110 may use the first RF resource chain. The RF resource 218a may be coupled to antenna 220a and may perform transmit/receive functions for the wireless services, such as services associated with SIM 204a, of the communications device 110. The RF resource 218a may provide separate transmit and receive functionality, or may include a transceiver that combines transmitter and receiver functions. A second RF resource chain may include the second modem processor 216b, which may perform baseband/modem functions for communicating with/controlling an interface technology, and may include one or more amplifiers and radios, referred to generally herein as RF resources (e.g., RF resources 218b). The RF resource 218b may be coupled to antenna 220b and may perform transmit/receive functions for the wireless services of the communications device 110. The RF resource 218*b* may provide separate transmit and receive functionality, or may include a transceiver that combines transmitter and receiver functions.

In various embodiments, the first RF resource chain including the first modem processor 216*a* and the second RF resource chain including the second modem processor 216*b* may be associated with different interface technologies. For example, one RF resource chain may be associated with a cellular air interface technology and the other RF resource chain may be associated with a WLAN technology. As another example, one RF resource chain may be associated with a cellular air interface technology and the other RF resource chain may be associated with a personal area network (PAN) technology. As another example, one RF resource chain may be associated with a PAN technology and the other RF resource chain may be associated with a WLAN technology. As another example, one RF resource chain may be associated with a cellular air interface technology and the other RF resource chain may be associated with a satellite interface technology. As another example, one RF resource chain may be associated with a WLAN technology and the other RF resource chain may be associated with a satellite air interface technology. Other combinations of different interface technologies, including wired and wireless combinations, may be substituted in the various embodiments, and cellular air interface technologies, WLAN technologies, satellite interface technologies, and PAN technologies are merely used as examples to illustrate aspects of the various embodiments.

In some embodiments, the general processor 206, the memory 214, the modem processors 216*a*, 216*b*, and the RF resources 218*a*, 218*b* may be included in the communications device 110 as a system-on-chip. In some embodiments, the SIM 204*a* and the corresponding interface 202*a* may be external to the system-on-chip. Further, various input and output devices may be coupled to components on the system-on-chip, such as interfaces or controllers. Example user input components suitable for use in the communications device 110 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. As another example, the request to initiate the outgoing call may be in the form of a voice command received via the microphone 212. Interfaces may be provided between the various software modules and functions in the communications device 110 to enable communications between them. Inputs to the keypad 224, touchscreen display 226, and the microphone 212 discussed above are merely provided as examples of types of inputs that may initiate an outgoing call and/or initiate other actions on the communications device 110. Any other type of input or combinations of inputs may be used in various embodiments to initiate an outgoing call and/or initiate other actions on the communications device 110.

The communications device 110 may include a probe manager 230 configured to manage network probing. The probe manager 230 may be configured to send probes via the different interface technologies of the communications device 110. The probe manager 230 may further be configured to receive probe replies via the different interface technologies of the communications device 110. The probe manager may maintain a running counter of a probe timeout counter, which may indicate a number of discovered NATs in a network traffic path.

In some embodiments, the probe manager 230 may be implemented within the general processor 206. In some embodiments, the probe manager 230 may be implemented as a separate hardware component (i.e., separate from the general processor 206). In some embodiments, the probe manager 230 may be implemented as a software application stored within the memory 214 and executed by the general processor 206. In various embodiments, the probe manager 230-modem processors 216*a*, 216*b*, RF resources 218*a*, 218*b*, and/or SIM 204*a* may be implemented in hardware, software, firmware, or any combination thereof.

While two RF resource chains including the first modem processor 216*a* and the second modem processor 216*b* are illustrated in FIG. 2, additional RF resource chains and additional modem processors may be included in the communications device 110, thereby enabling additional network connections to be made at the same time. Additionally, wired connections may be established via modem processors connected to input/output ports of the communications device 110.

Figure 3:
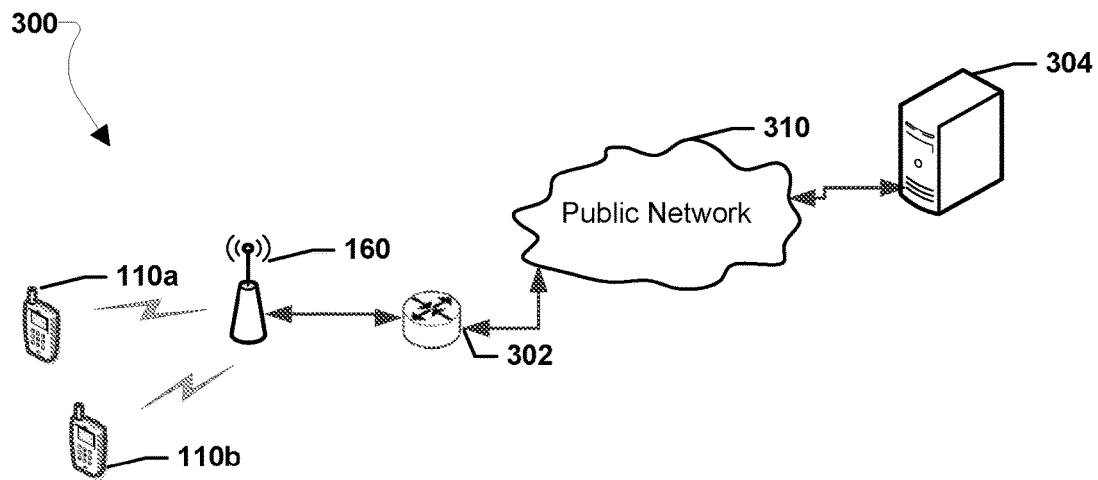
FIG. 3 is a block diagram illustrating interactions between a communications device and a network for network probing according to various embodiments.

FIG. 3 is a network diagram illustrating interactions between a communications device (e.g., the communications device 110 described with reference to FIGS. 1-3) and a network 300 for network probing according to various embodiments. One or more communications devices 110*a*, 110*b* may establish a network connection of a WLAN interface technology with one or more access points (i.e., NATs/access points running NAT services) such as a wireless access point 160 and a router 302. The network 300 represents a configuration in which no rogue access points are present, and is suitable for implementing the various embodiments.

A communications device 110*a*, 110*b* may generate a probe addressed to the STUN server 304 connected to the access point 160 by router 302 and a public network 310. The wireless access point 160 may receive the probe, determine the destination IP and destination port (i.e., STUN server IP and port), and generate a one-to-one mapping for the data flow from the source IP address and source port of the communications device 110*a*, 110*b* to the STUN server using a global IP and global port. In some embodiments, a network traffic path may contain multiple legitimate wireless access devices such as wireless access point 160 and router 302. The router 302 may receive a public data flow from wireless access point 160. The public data flow may have originated with private data flow from a communications device 110*a*, 110*b* and been mapped to the public flow by the NAT service running on wireless access point 160.

The probe addressed to the STUN server 304 may be routed over the public network 310 (e.g., the Internet 164) from the wireless access point 160 or the router 302 to the STUN server 304. Similarly, the STUN server 304 may transmit a probe reply over the public network 310 to either the router 302 or the wireless access point 160, whichever access point is operating as the far NAT in the network traffic path (i.e., closest to the STUN server in the network path). The far NAT (e.g., the router 302 in FIG. 3) may use one or more translation tables to look up the one-to-one mapping between the public data flow and a private data flow associated with one of communications devices 110*a*, 110*b*. The private data flow of the router 302 may be the public data flow for wireless access point 160. Thus, a second mapping lookup may be performed as the probe reply packets traverse the wireless access point 160. The public data flow of the wireless access point 160 may be mapped to a private data flow of one of communications devices 110a, 110b and the probe reply sent to the appropriate device.

Figure 4:
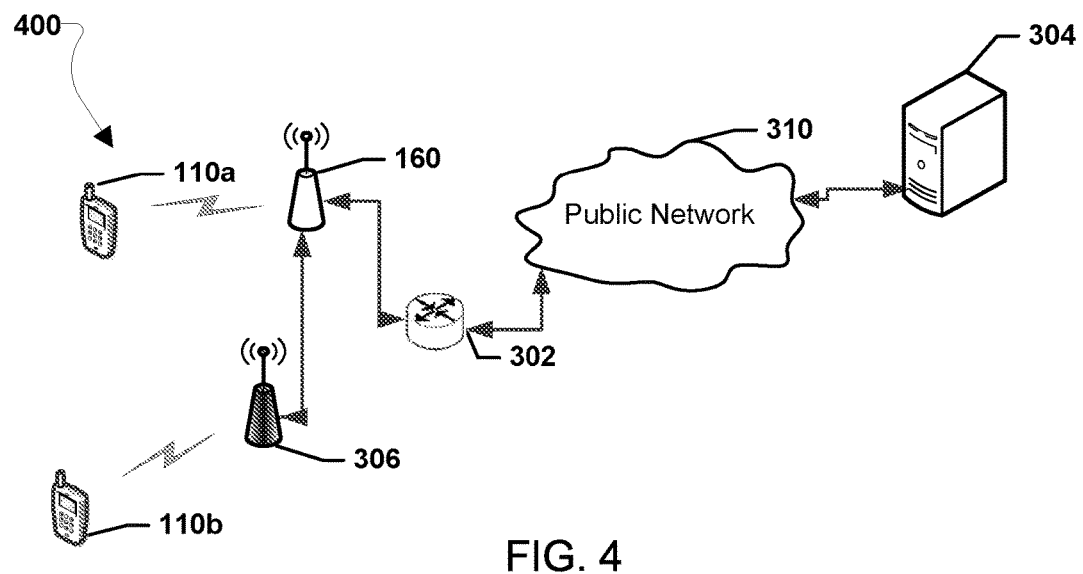
FIG. 4 is a block diagram illustrating interactions between a communications device and a network for network probing according to various embodiments.

FIG. 4 is a network diagram illustrating interactions between a communications device (e.g., the communications device 110 described with reference to FIGS. 1-4) and a network 400 for network probing according to various embodiments. One or more communications devices 110a, 110b may establish a network connection of a WLAN interface technology with one or more access points (i.e., NATs/access points running NAT services) such as the wireless access point 160, rogue access point 306, and router 302. The network 400 represents a configuration in which a rogue access point is present in the network traffic path, and is suitable for implementing the various embodiments.

As described with reference to FIG. 3, communications devices 110a, 110b may generate multiple probes addressed to the STUN server 304. In the example illustrated in FIG. 3, the communications device 110a is connected to and associated with the wireless access point 160, which is the communications device's 110a near NAT, and the communications device 110b is connected to and associated with a rogue access point 306, which is the communications device's 110b near NAT. Because the rogue access point 306 does not have authorized access to the data flow backhaul, the rogue access point 306 must run NAT services and send public data flows to the wireless access point 160 for routing. Thus, probes transmitted by the communications device 110b will experience extra processing load, which may present a drain on network time and energy resources.

The wireless access point 160 may receive the probe either directly from communications device 110a or as a public flow from the rogue access point 306. A probe arriving from the communications device 110a may have a packet header containing a 5-tuple including the source IP and source port of the communications device 110a. However, because the packet headers of the probe originating from communications device 110b is modified as the packets traverse the rogue access point 306 (i.e., as the NAT mapping commences), the source IP and source port of the probe received at the wireless access point 160 will reflect the IP and port associated with the rogue access point 306. Both probes may have their packet headers modified according to their respective NAT mappings of the wireless access point 160 and may continue traversing the network path as described in detail with reference to FIG. 3.

In various embodiments, the presence of a rogue access point 306 results in the need for an additional "hop" in the network traffic path that a probe must traverse. The communications device 110a that is not connected to and associated with the rogue access point 306 may require two hops to reach the STUN server 304, the wireless access point 160 and the router 302. The communications device 110b that is connected to and in association with the rogue access point 306 may require three hops to reach The STUN server, the rogue access point 306, the wireless access point 160, and the router 302. Various embodiments and implementations enable the determination of the number of hops or NATs that a probe must traverse to reach a STUN server, and thus the number of NATs that are present within a network traffic path. This number may differ for various devices within a local network as not all devices may be connected to the same access point (i.e., the same near NAT).

Figure 5:
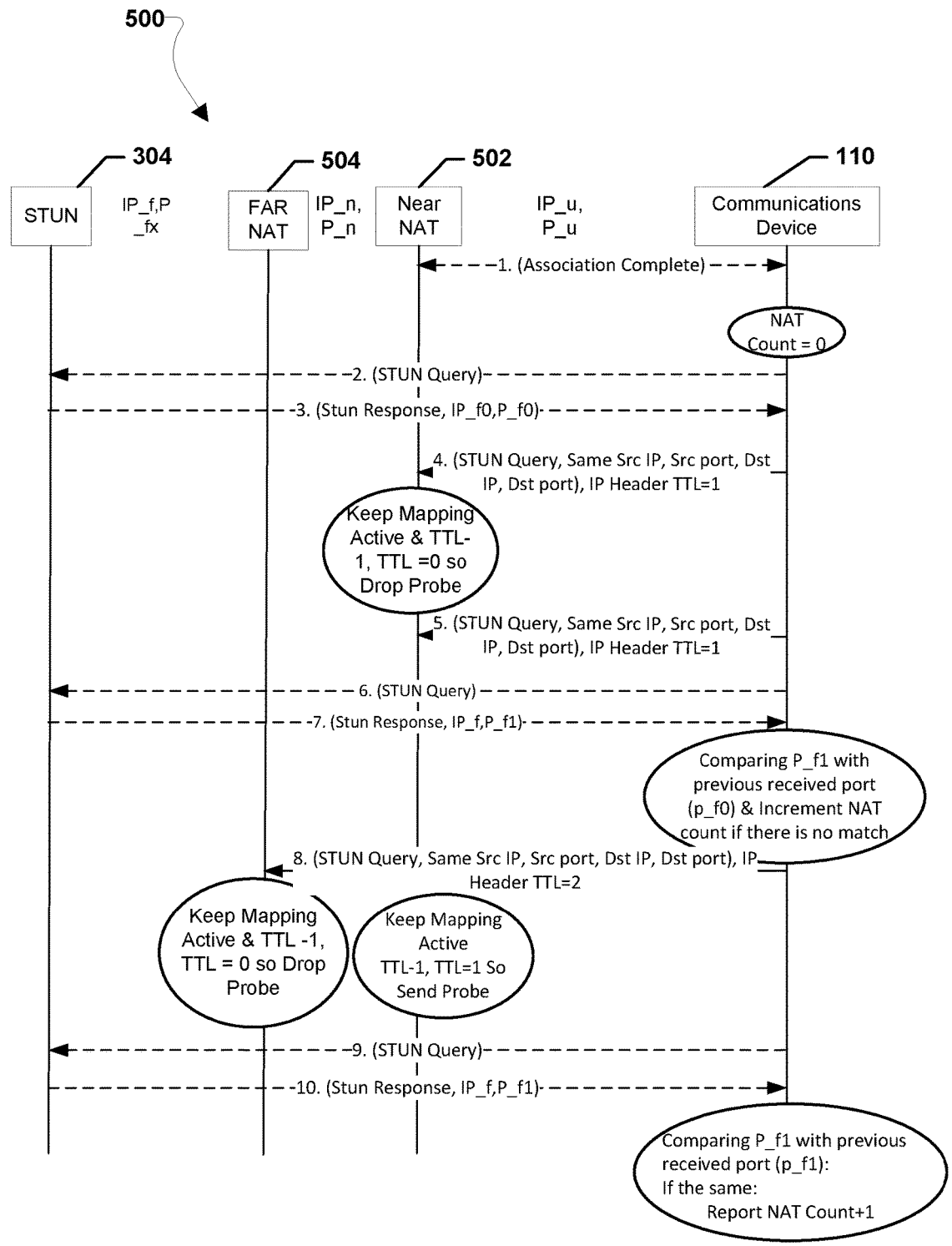
FIG. 5 is a process flow diagram illustrating a method for network probing with a communications device according to various embodiments.

FIG. 5 illustrates a data flow diagram of data flows 500 for network probing according to various embodiments. With reference to FIGS. 1-5, the data flows 500 may be generated and manipulated with a processor (e.g., the general processor 206, the modem processors 216a, 216b, a separate controller, and/or the like) of a communications device (e.g., the communications device 110 described with reference to FIGS. 1-2). For example, the data flows 500 may be initiated and controlled by a probe manager (e.g., the probe manager 230) running on a processor (e.g., the general processor 206, the modem processors 216a, 216b, a separate controller, and/or the like) of a communications device (e.g., the communications device 110 described with reference to FIGS. 1-2).

In various embodiments, a communications device 110 may establish a connection with an access point by connecting to a pre-designated access point, an access point offering the strongest RF signal, or the nearest access point to the communications device's physical location. In operation 1, the communications device 110 may associate with an access point (e.g., wireless access point 160), which may assign the communications device 110 a local IP address and determine a local communications port. That is, the access point may provide the communications device with connection information in the form of a local network IP address and port number to enable the routing of packets to and from the communications device via a local network (e.g., a private network). Upon association and the establishment of a data connection, the communications device may determine that the associated access point is the nearest NAT within the network traffic path and is thus the near NAT 502.

In operation 2, the probe manager 230 of the communications device may generate a probe (e.g., a STUN query). The packet header of the probe may contain the 5-tuple (source_IP, source_Port, server_IP, server_Port, UDP), in which the source is the communications device (i.e., user equipment), the server is the STUN server and the communication protocol to be used is UDP. The probe may be sent from the communications device 110 to the near NAT 502, and may continue through a network traffic path to a far NAT 504. At each NAT in the network traffic path, a new IP mapping is generated for the data flow. The source_IP and source_Port information contained in the probe packet header may be changed to the WAN IP and port of the respective NAT. Thus, after traversing the near NAT 502, the probe's packet header includes the 5-tuple (near-NAT_IP, near-NAT_Port, server_IP, server_Port, UDP). The generation of new local to global (i.e., private to public) IP mappings and associated modification of probe packet headers to reflect current NAT WAN IP and port may continue until the probe traverses the far NAT 504 and is received by the STUN server 304. Upon routing from the far NAT 504 to the STUN server 304 via a public network, the 5-tuple includes (far-NAT_IP, far-NAT_Port, server_IP, server, Port, UDP).

In operation 3, the STUN server 304 may transmit a probe reply containing at least the information: (far-NAT_IP, far-NAT_Port, originator_IP, originator_Port). The probe reply may transit the network traffic path in reverse. Each NAT from the far NAT 504 to the near NAT 502 may access a translation table stored in a local memory to map the NAT's global IP and port (e.g., WAN IP and port) to a local IP and port, or the global IP and port of the next NAT in the network traffic path. For example, the far NAT may receive the probe reply, access a locally stored translation table, and map the received reply to the next NAT in the network traffic path. The far NAT may use the IP and port number of the STUN server as the "destination_IP" and "destination_Port" in order to reverse the mapping and determine the next NAT in the traffic path (i.e., the NAT that transmitted the probe to the far NAT on the way to the STUN server). The next NAT in the network traffic path may receive the probe reply and may also access a locally stored translation table, using the IP address and port number of the far NAT (from which the next NAT received the probe reply) to reverse the mapping and determine the next hop in the network traffic path. The final hop in the network traffic path may be the communications device, which may receive the probe reply via a local IP address and port number. The probe manager 230 may store the probe reply in a local memory (e.g., memory 214) for later comparison.

The probe manager 230 of the communications device 110 may increment a locally stored probe timeout counter. In some implementations, the count value of the probe timeout counter may be initialized to zero during association with the near NAT 502. Each time the probe manager sends a probe to the STUN server, the probe manager may increment the probe timeout counter. Incrementing the probe timeout counter to "1" indicates the presence of at least one NAT in the network traffic path. The communications device may determine that there is at least one NAT because if there were no NATs in the network traffic path, no data flow would occur and a STUN server probe reply would not be received.

In various embodiments, the probe manager 230 of the communications device 110 may transmit a test probe addressed to the STUN server 304 in operation 4. Because an IP mapping was generated for the communications device to STUN server data flow during the last probe traversal, the near NAT 502 maintains the existing mapping in an active state within the near NAT's 502 network address translation tables. The near NAT 502 may read the probe timeout counter in the test probe packet header. The value of the timeout counter may indicate to a NAT the number of hops permitted in the network traffic path before the test probe packets should be dropped, detected, or otherwise prevented from progressing in the network traffic path. As a test probe traverses the network traffic path, each NAT decrements the probe timeout counter until the counter reaches zero, after which no further hops (i.e., packet relays) are permitted. In operation 4, the probe timeout counter (i.e., a time to live or "TTL") is set to 1 indicating that a successful test probe has been sent and a reply received, therefore at least one NAT is present in the network traffic path. With the timeout counter storing a current value of 1, the number of permitted hops for the test probe is exhausted when the test probe is received by the near NAT 502 and the timeout counter of the test probe is decremented. As a result, the near NAT may maintain the active IP mapping for the data flow, but may drop the test probe packets. Any NATs lying beyond the near NAT, up to and including the far NAT 504 will not receive the test probe, thus their IP mappings for the data flow will timeout and be released (e.g., removed from respective translation tables). After the test probe is dropped, the near NAT 502 is the only NAT with an active IP mapping for the data flow from the communications device 110 to the STUN server 304.

In operation 5, the probe manager 230 of the communications device 110 may transmit additional test probes having the same timeout counter as the previous test probe. Additional test probes may be sent at intervals to ensure that each recipient NAT maintains an active mapping for the traffic flow. Thus, the communications device 110 may ensure that desired mappings remain active by transmitting regular test probes having the same timeout counter between STUN server queries.

In various embodiments, the probe manager 230 of the communications device 110 may again transmit a probe addressed to the STUN server 304 in operation 6. Because the test probe was received at the near NAT 502, causing it to maintain an active IP mapping, the current probe may traverse the near NAT 502 without causing the generation of a new IP mapping. That is, the translation of the local IP address and port of the data flow may be accomplished simply through lookup of the one-to-one mapping in the near NAT 502 translation tables and modifying the appropriate packet header. However, each subsequent NAT in the network traffic path (e.g., far NAT 504) will generate a new IP mapping upon receipt of the probe, because the relevant mappings have already expired and been released. In the illustrated example, the mapping for the near NAT 502 remains the same, while the mapping for the far NAT 504 is generated anew. Therefore, the global IP and port assigned by the near NAT 502 to the local data flow remains the same but the global IP and port of the far NAT 504 will not be new, and likely different from that used on the previous probe addressed to the STUN server 304 (e.g., operation 2).

In operation 7, the STUN server 304 may return a new probe reply containing the far-NAT_IP and far-NAT_Port. The probe manager 230 may compare the second received probe reply to the first probe reply to determine whether they match. More specifically, the probe manager 230 may determine whether the far-NAT_IP and far-NAT_Port differs between probe replies. If no match is found, then the probe manager 230 determines that there are still unaccounted for NATs lying in the network path. The probe manager 230 of the communications device 110 may again increment the probe timeout counter, such that it holds the value "2".

In operation 8, the probe manager 230 of the communications device may send a second test probe, containing the incremented probe timeout counter. As before, the probe may traverse the near NAT 502 without causing the generation of a new IP mapping. Because the test probes are sent before the NAT's internal mapping timeout duration is exhausted, the IP mapping for the communications device 110 to STUN server 304 data flow remains active. The near NAT 502 may evaluate the probe timeout counter and decrement the counter by "1" because 1 hop has already been made in the network traffic path. The test probe will have a probe timeout counter having a value that is 1 less than when it arrived at the near NAT 502. The probe timeout counter began at "2" and then has value of "1" indicating that one more hop is permitted in the network traffic path before the test probe packets should be dropped. Therefore, the near NAT 502 modifies the source header information (e.g., source_IP and source_Port) and passes the test probe to the far NAT 504. The far NAT 504 determines that the IP mapping is still active and does not release the mapping. The far NAT 504 may then decrement and evaluate the probe timeout counter from "1" to "0". No further hops of the test probe are permitted, and the far NAT 504 drops the test probe packets. At the end of the second test probe transmission, both the near NAT 502 and far NAT 504 are actively maintaining their IP mappings for the communications device to STUN server data flow. Again, additional test probes with the same timeout counter may be sent at intervals to ensure that each recipient NAT maintains an active mapping for the traffic flow. Thus, the communications device 110 may ensure that desired mappings remain active by transmitting regular test probes having the same timeout counter between STUN server queries.

The probe manager 230 may send a third probe addressed to the STUN server 304 in operation 9. This time, the probe may traverse the entire network traffic path (i.e., both the near NAT 502 and far NAT 504) without causing any NATs to generate a new IP mapping. The second test probe reached both NATs, causing both to maintain active mappings. Each NAT may use the active mappings stored in their respective translation tables to modify the packet headers of the third probe.

The probe may be routed on to the STUN server 304, which may generate and send a third probe reply containing the far NAT_IP and far-NAT_Port in operation 10. The probe manager 230 may again compare the received probe reply to the last previous probe reply (e.g., second probe reply) to determine if the far NAT information has changed. At the end of operation 10, the far NAT information in the third and second probe replies matches because no new IP mappings were generated during the probe's traversal of the network traffic path. The probe manager 230 may determine that the current value of the probe timeout counter (i.e., 2) is the number of NATs lying in the network traffic path.

Various implementations may include repeating operations 2 through 10 until two concurrent probe replies are received in which the far NAT information matches.

Various implementations may compare the final probe timeout counter (e.g., number of NATs present in a network traffic path) to an expected value. The expected value may be the number of NATs that is expected to lie within a network connection. Such information may be provided by network administrators, or on-device applications or statistics.

Figure 6:
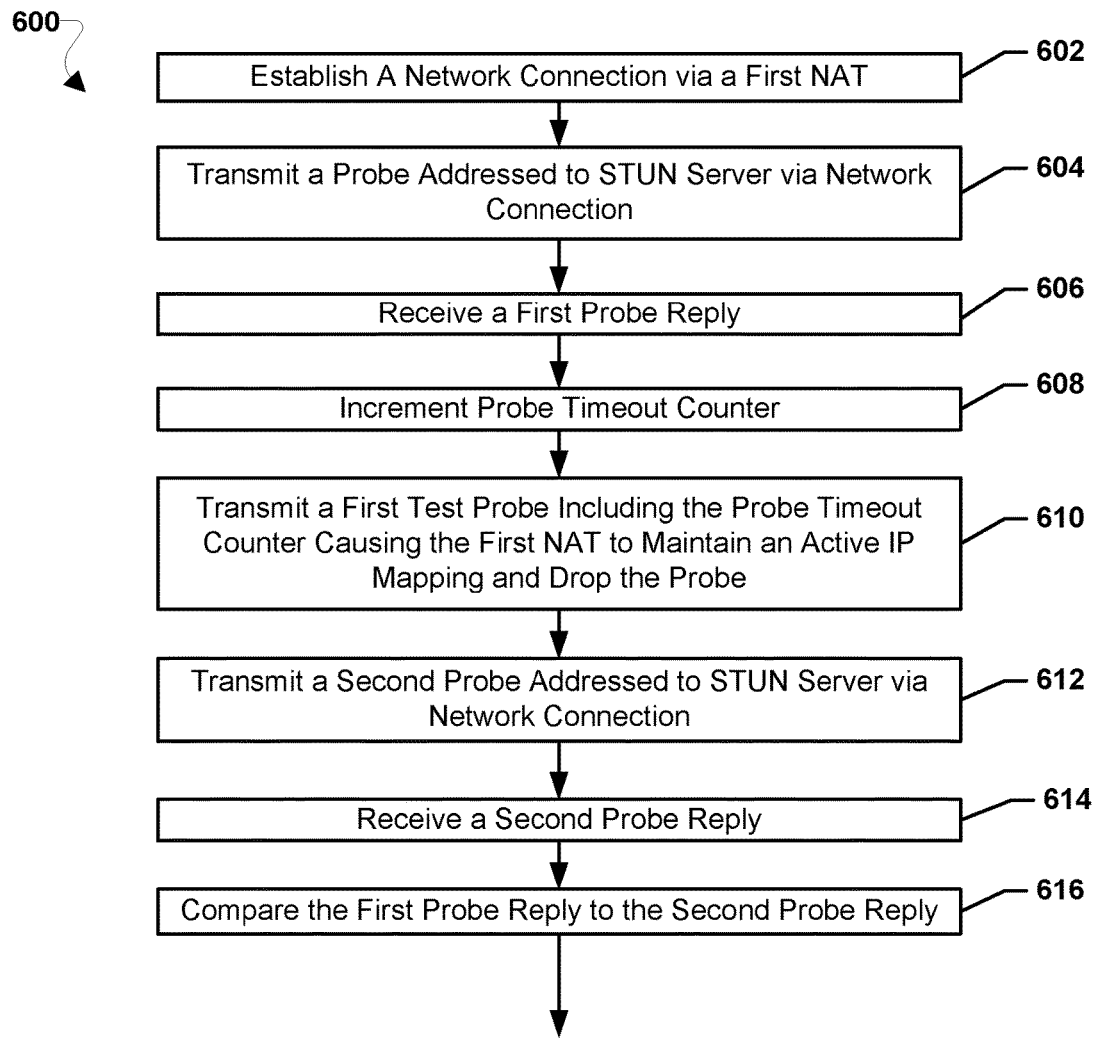
FIG. 6 is a process flow diagram illustrating a method for network probing with a communications device according to various embodiments.

FIG. 6 illustrates a method 600 for network probing according to various embodiments. With reference to FIGS. 1-6, the method 600 may be implemented with a processor (e.g., the general processor 206, the modem processors 216*a*, 216*b*, a separate controller, and/or the like) of a communications device (e.g., the communications device 110 described with reference to FIGS. 1-2). For example, the method 600 may be implemented by a probe manager (e.g., the probe manager 230) running on a processor (e.g., the general processor 206, the modem processors 216*a*, 216*b*, a separate controller, and/or the like) of a communications device (e.g., the communications device 110 described with reference to FIGS. 1-2).

In block 602, the probe manager 230 may establish a network connection with a local access point (e.g., access point 160). Other combinations of different interface technologies, including wired and wireless combinations, may be substituted in various implementations. Cellular air interface technologies, WLAN technologies, satellite interface technologies, and PAN technologies are referred to herein merely as examples to illustrate aspects of the various embodiments. As part of establishing a network connection, the probe manager 230 may associate the network connection with the communications device. That is, the access point (e.g., access point 160) may assign the communications device (e.g., communications device 110) local network configuration settings such as IP address and a port number. The communications device may label the access point as the near NAT 502 because it lies first in the communications device's network traffic path.

In block 604, the probe manager may generate and transmit a probe addressed to the probing server based at least in part on the first network setup information and the second network setup information. For example, the probe manager may generate a probe addressed from the probing client to the probing server based at least in part on the addresses of the respective network connections, such as the respective global IP addresses. The probe manager may generate a probe addressed to the probing server that includes the information necessary to deliver the probe the STUN server, including the communications device IP address, the communications device communications port, the STUN server's IP address, the STUN server's communications port number, and the communication protocol used to transmit the probe. For example, the probe may contain the 5-tuple: source_IP, source_Port, server_IP, server Port, and UDP. The probe manager may transmit the probe addressed to the STUN server via the network connection. As discussed with reference to FIG. 5, the probe may traverse one or more access points running NAT services (e.g., near NAT 502 and far NAT 504). Each NAT may perform a one-to-one mapping of the local data flow from the communications device to the STUN server as the probe moves through the network traffic path.

In block 606, the probe manager 230 may receive a first probe reply from the STUN server (e.g., STUN server 304). The STUN server may receive the probe as the public data flow from the last NAT in the network traffic path (e.g., far NAT 504). The STUN server may send a probe reply to the communications device (e.g., communications device 110) containing at least the IP address and the port of the NAT closest to the STUN server (e.g., far NAT 504). Additional information may include the NAT configuration, mapping schema, NAT format, and the like. The first probe reply may be stored locally on the communications device for later comparison to future probe replies.

In block 608, the probe manager 230 may increment a probe timeout counter. The probe timeout counter may indicate the number of hops a packet is permitted to traverse in the network path. This value may be equal to the number of NATs that have been counted in the network traffic path.

In block 610, the probe manager 230 may transmit a first test probe to the first NAT (e.g., near NAT 504). Although the test probe may be addressed to the STUN server in order to keep the associated data flow mappings active, the test probe does not travel beyond the first NAT. The probe timeout counter contained in the packet header of the test probe provides an indication to the NAT that only one hop is allowed, and the test probe packets should be dropped. Thus, sending the test probe to the first NAT may cause the NAT to maintain the active mapping of the communications device data flow to the STUN server and to drop the test probe packets. By effectively instructing the first NAT to drop the test probe, the probe manager 230 ensures that the remaining NATs in the network traffic path (e.g., far NAT 504) allow their IP mappings for the communications device to the STUN server to expire. Additional test probes having the same timeout counter may be sent at intervals as part of the operations in block 610 to ensure that each recipient NAT maintains an active mapping for the traffic flow.

In block 612, the probe manager 230 may send a second probe addressed to the STUN server (e.g., STUN server 304). Like the first probe, the probe manager may address the second probe to the probing server with the information necessary to deliver the probe the STUN server, including the communications device IP address, the communications device communications port, the STUN server's IP address, the STUN server's communications port number, and the communication protocol used to transmit the probe. For example, the probe may contain the 5-tuple: source_IP, source_Port, server_IP, server_Port, and UDP. Like the first probe, but unlike the test probe, the second probe may traverse the entire network traffic path. New IP mappings may be generated by all NATs other than the first NAT (e.g., near NAT 502), which received the test probe.

In block 614, the probe manager 230 may receive a second probe reply. The second probe reply may be generated and transmitted by the STUN server (e.g., STUN server 304). The second probe reply may contain the same or similar information to that contained in the first probe reply; however, the IP address and port of the closest NAT to the STUN server may have changed due to updated IP mappings.

In block 616, the probe manager 230 may compare the contents of the first probe reply with the contents of the second probe reply.

Figure 7:
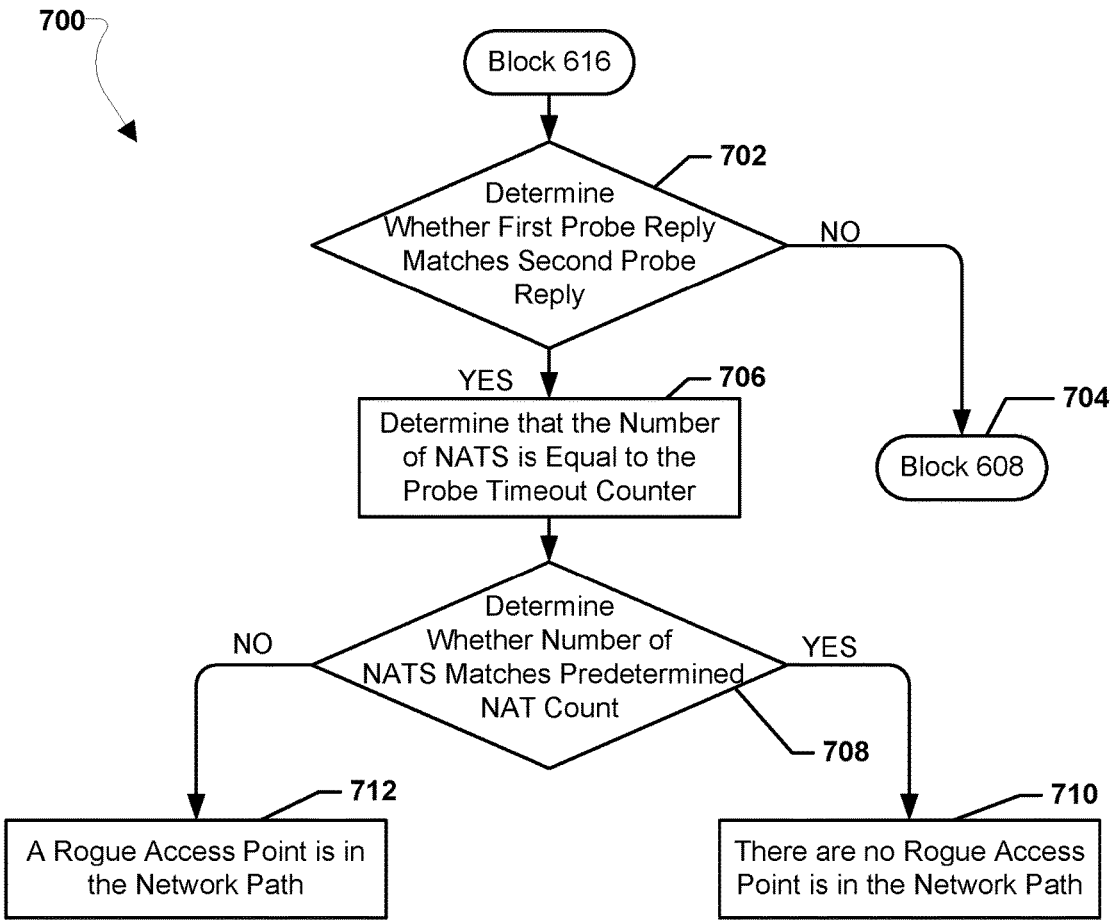
FIG. 7 is a process flow diagram illustrating a method for network probing with a communications device according to various embodiments.

FIG. 7 illustrates a method 700 for network probing according to various embodiments. With reference to FIGS. 1-7, the method 700 may be implemented with a processor (e.g., the general processor 206, the modem processors 216a, 216b, a separate controller, and/or the like) of a communications device (e.g., the communications device 110 described with reference to FIGS. 1-2). For example, the method 700 may be implemented by a probe manager (e.g., the probe manager 230) running on a processor (e.g., the general processor 206, the modem processors 216a, 216b, a separate controller, and/or the like) of a communications device (e.g., the communications device 110 described with reference to FIGS. 1-2).

In determination block 702, the probe manager may determine whether the first probe reply and the second probe reply match based on the information contained within each reply. Specifically, the probe manager 230 may compare the IP address and port for the farthest NAT from the communications device (e.g., communications device 110) in the network traffic path. As discussed with reference to FIG. 5, a match of the far NAT IP address and port between the two probe replies may indicate that there are no unaccounted for NATs remaining in the network traffic path.

In response to determining that the results of the comparison do not match (i.e., determination block 702="No"), the probe manager may, in block 704, again increment the probe timeout counter by returning to block 608 of the method 600, and perform the operations of blocks 610-616 of the method 600 as described with reference to FIG. 6.

In response to determining that the results of the comparison do match, (i.e., determination block 702="Yes"), the probe manager 230 may determine that the number of NATs in the network traffic path is equal to the value of the probe timeout counter in block 706. For example, if the probe timeout counter has been incremented to "2", then the probe manager 230 may determine that the number of NATs in the network traffic path is two.

In determination block 708, the probe manager may determine whether the number of NATs is equal to a pre-determined number of NATs. The pre-determined number of NATs may be an expected number of NATs in the traffic path.

In response to determining that the number of NATs matches the pre-determined number of NATs (i.e., determination block 708="Yes"), the processor may determine that there are no rogue access points present in the network traffic path in block 710. Conversely, in response to determining that the number of NATs does not equal the pre-determined number of NATs (i.e., determination block 708="No"), the processor may determine that there may be a rogue access point in the network traffic path in block 712.

Figure 8:
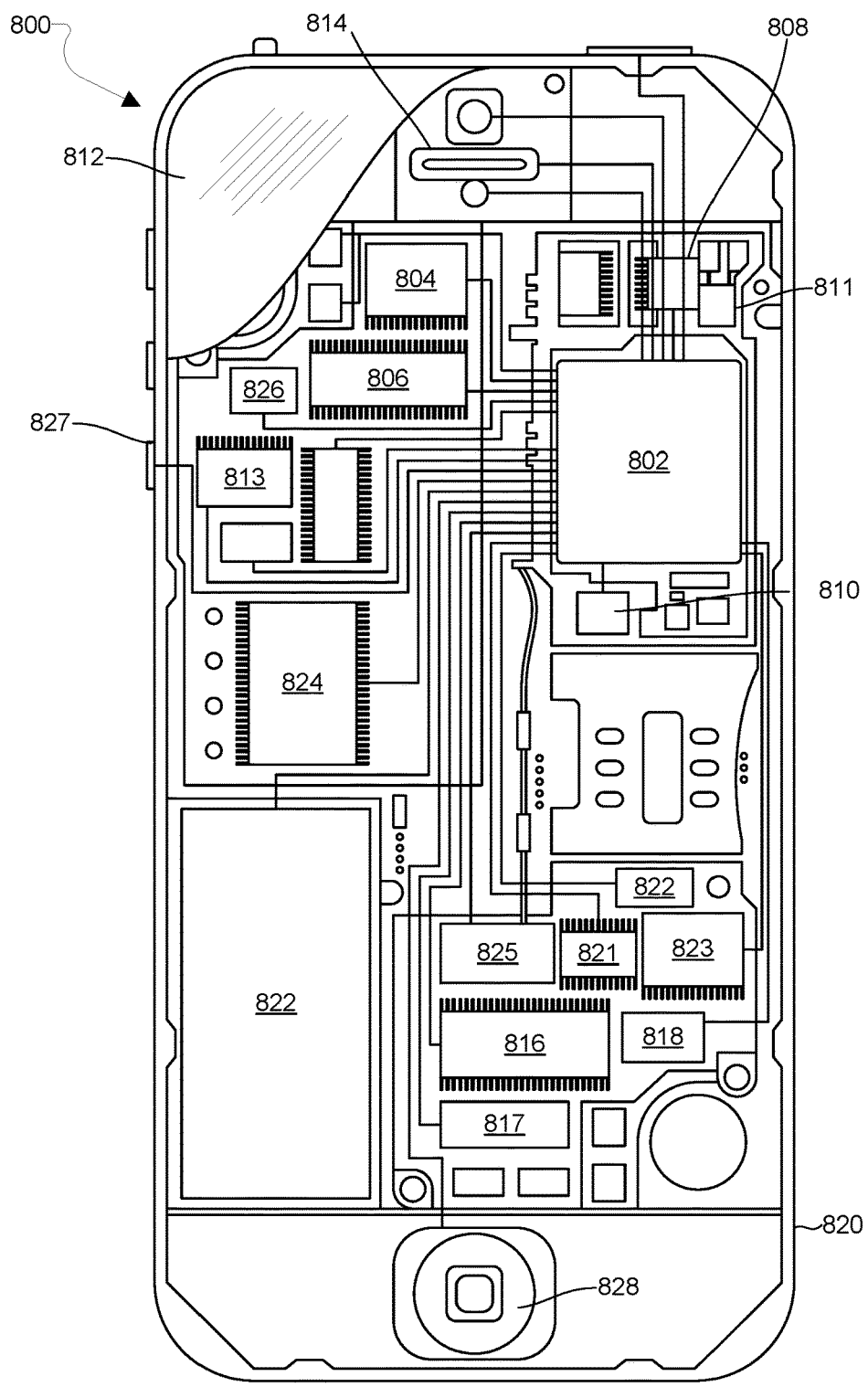
FIG. 8 is a component block diagram of a communications device suitable for implementing some embodiments.

Various embodiments may be implemented in any of a variety of communications devices, an example on which (e.g., communications device 800) is illustrated in FIG. 8. With reference to FIGS. 1-8, the communications device 800 may be similar to the communications device 110 and may implement the method 500, the method 600, and/or the method 700 as described.

The communications device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the communications device 800 need not have touch screen capability.

The communications device 800 may have one or more cellular network transceivers 808 coupled to the processor 802 and to one or more antennae 810 and configured for sending and receiving cellular communications. The transceiver 808 and the antenna 810 may be used with the circuitry mentioned herein to implement the methods of various embodiments. The communications device 800 may include one or more SIM cards (e.g., SIM 813) coupled to the transceiver 808 and/or the processor 802 and configured as described. The communications device 800 may include a cellular network wireless modem chip 817 coupled to the processor 802 that enables communications via a cellular network.

The communications device 800 may have one or more WLAN transceivers 816 (e.g., one or more Wi-Fi transceivers) coupled to the processor 802 and to one or more antennae 811 and configured for sending and receiving WLAN communications. The transceiver 816 and the antenna 811 may be used with the circuitry mentioned herein to implement the methods of various embodiments. The communications device 800 may include a WLAN wireless modem chip 818 coupled to the processor 802 that enables communications via a WLAN.

The communications device 800 may have one or more Bluetooth transceivers 821 coupled to the processor 802 and configured for sending and receiving Bluetooth communications. The Bluetooth transceiver 821 may be used with the circuitry mentioned herein to implement the methods of various embodiments. The communications device 800 may include a Bluetooth wireless modem chip 823 coupled to the processor 802 that enables communications via Bluetooth.

The communications device 800 may have one or more satellite transceivers 824 coupled to the processor 802 and to one or more antennae 825 and configured for sending and receiving Bluetooth communications. The transceiver 824 and the antenna 825 may be used with the circuitry mentioned herein to implement the methods of various embodiments. The communications device 800 may include a satellite wireless modem chip 826 coupled to the processor 802 that enables communications via satellite networks.

The communications device 800 may also include speakers 814 for providing audio outputs. The communications device 800 may also include a housing 820, constructed of a plastic, metal, or a combination of materials, for containing all or some of the components discussed herein. The communications device 800 may include a power source 822 coupled to the processor 802, such as a disposable or rechargeable battery. The rechargeable battery may also be coupled to the peripheral device connection port to receive a charging current from a source external to the communications device 800. The peripheral device connection port, such as a USB port, may be connected to the processor 802, and may be configured to established wired network connections via wired interface technologies and may be used with the circuitry mentioned herein to implement the methods of the various embodiments. The communications device 800 may also include a physical button 828 for receiving user inputs. The communications device 800 may also include a power button 827 for turning the communications device 800 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a variety of processors. Examples of suitable processors include, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to some embodiments without departing from the scope of the claims. Thus, the present disclosure is not intended to be limited to the examples shown herein but is to be accorded the widest scope consistent with the following claims and the principles and novel features disclosed herein.

What is claimed is:

1. A method of network probing by a communications device, comprising:
    transmitting a first probe addressed to a Simple Traversal Utilities for NATs (STUN) server from the communications device via a network connection to a first Network Address Translator (NAT);
    receiving, at the communications device, a first probe reply from the STUN server;
    incrementing a probe timeout counter that indicates a number of NATs along a network traffic path that a probe will traverse before being dropped;
    transmitting a first test probe including the incremented probe timeout counter in packet header information of the first test probe via the network connection, the first test probe causing each of the number of NATs indicated by the incremented probe timeout counter to maintain an active address translation mapping for the communications device;
    transmitting a second probe addressed to the STUN server from the communications device via the network connection;
    receiving, at the communications device, a second probe reply from the STUN server;
    determining whether packet header information of the first probe reply matches packet header information of the second probe reply; and
    determining that the number of NATs in the network traffic path is equal to the incremented probe timeout counter in response to determining that the packet header information of the first probe reply matches the packet header information of the second probe reply.

2. The method of claim 1, wherein the first probe and the second probe each comprises a communications device Internet Protocol (IP) address, a communications device communications port number, a STUN server IP address, a STUN server communications port number, and a communication protocol used to transmit the probe.

3. The method of claim 1, further comprising:
in response to determining that the packet header information of the first probe reply does not match the packet header information of the second probe reply
incrementing the incremented probe timeout counter to produce an updated probe timeout counter;
transmitting a second test probe including the updated probe timeout counter in packet header information of the second probe via the network connection, the second test probe causing each of the number of NATs indicated by the updated probe timeout counter to maintain an active address translation mapping for the communications device;
transmitting a third probe addressed to the STUN server from the communications device via the network connection;
receiving, at the communications device, a third probe reply from the STUN server;
determining whether packet header information of the third probe reply matches packet header information of the second probe reply; and
determining that the number of NATs in a network path is equal to the updated probe timeout counter in response to determining that the packet header information of the third probe reply matches the packet header information of the second probe reply.

4. The method of claim 1, further comprising determining that a rogue access point is present in the network path in response to determining that the determined number of NATs in the network path does not match a predetermined number of NATs.

5. The method of claim 1, wherein the packet header information of the first probe reply is a final IP address and port number, and the packet header information of the second probe reply is a second final IP address and port number.

6. The method of claim 1, further comprising initializing the probe timeout counter to zero prior to transmitting the first probe.

7. The method of claim 1, wherein IP addresses and local ports of multiple computing devices are mapped to the same global IP address and global port of the first NAT.

8. A communications device, comprising:
a transceiver configured to send and receive packets over a communications network; and
a processor coupled to the transceiver and configured to:
transmit a first probe addressed to a Simple Traversal Utilities for NATs (STUN) server via a network connection to a first Network Address Translator (NAT);
receive a first probe reply from the STUN server;
increment a probe timeout counter indicating that indicates a number of NATs along a network traffic path that a probe will traverse before being dropped;
transmit a first test probe including the incremented probe timeout counter in packet header information of the first test probe via the network connection, the first test probe causing each of the number of NATs indicated by the incremented probe timeout counter to maintain an active address translation mapping for the communications device;
transmit a second probe addressed to the STUN server via the network connection;
receive a second probe reply from the STUN server;
determine whether packet header information of the first probe reply matches packet header information of the second probe reply; and
determine that the number of NATs in a network path is equal to the incremented probe timeout counter in response to determining that the packet header information of the first probe reply matches the packet header information of the second probe reply.

9. The communications device of claim 8, wherein the first probe and the second probe each comprises a communications device Internet Protocol (IP) address, a communications device communications port number, a STUN server IP address, a STUN server communications port number, and a communication protocol used to transmit the probe.

10. The communications device of claim 8, wherein the processor is further configured with processor-executable instructions to:
in response to determining that the packet header information of the first probe reply does not match the packet header information of the second probe reply
increment the incremented probe timeout counter to produce an updated probe timeout counter;
transmit a second test probe including the updated probe timeout counter in packet header information of the second probe via the network connection, the second test probe causing each of the number of NATs indicated by the updated probe timeout counter to maintain an active address translation mapping for the communications device;
transmit a third probe addressed to the STUN server via the network connection;
receiving a third probe reply from the STUN server;
determine whether packet header information of the third probe reply matches packet header information of the second probe reply; and
determine that the number of NATs in a network path is equal to the updated probe timeout counter in response to determining that the packet header information of the third probe reply matches the packet header information of the second probe reply.

11. The communications device of claim 8, wherein the processor is further configured with processor-executable instructions to determine that a rogue access point is present in the network path in response to determining that the determined number of NATs in the network path does not match a predetermined number of NATs.

12. The communications device of claim 8, wherein the packet header information of the first probe reply is a final IP address and port number, and the packet header information of the second probe reply is a second final IP address and port number.

13. The communications device of claim 8, wherein the processor is further configured with processor-executable instructions to initialize the probe timeout counter to zero prior to transmitting the first probe.

14. The communications device of claim 8, wherein IP addresses and local ports of multiple computing devices are mapped to the same global IP address and global port of the first NAT.

15. A non-transitory processor readable medium having stored thereon processor-executable instructions configured to cause a processor of a communications device to perform operations comprising:
transmitting a first probe addressed to a Simple Traversal Utilities for NATs (STUN) server via a network connection to a first Network Address Translator (NAT);

receiving a first probe reply from the STUN server;

incrementing a probe timeout counter that indicates a number of NATs along a network traffic path that a probe will traverse before being dropped;

transmitting a first test probe including the incremented probe timeout counter in packet header information of the first test probe via the network connection, the first test probe causing each of the number of NATs indicated by the incremented probe timeout counter to maintain an active address translation mapping for the communications device;

transmitting a second probe addressed to the STUN server via the network connection;

receiving a second probe reply from the STUN server;

determining whether packet header information of the first probe reply matches packet header information of the second probe reply; and determining that the number of NATs in a network path is equal to the incremented probe timeout counter in response to determining that the packet header information of the first probe reply matches the packet header information of the second probe reply.

16. The non-transitory processor readable medium of claim 15, wherein the first probe and the second probe each comprises a communications device Internet Protocol (IP) address, a communications device communications port number, a STUN server IP address, a STUN server communications port number, and a communication protocol used to transmit the probe.

17. The non-transitory processor readable medium of claim 15, wherein the stored processor-readable instructions are further configured to cause a processor of a communications device to perform operations comprising:

in response to determining that the packet header information of the first probe reply does not match the packet header information of the second probe reply incrementing the incremented probe timeout counter to produce an updated probe timeout counter;

transmitting a second test probe including the updated probe timeout counter in packet header information of the second probe via the network connection, the second test probe causing each of the number of NATs indicated by the updated probe timeout counter to maintain an active address translation mapping for the communications;

transmitting a third probe addressed to the STUN server via the network connection;

receiving a third probe reply from the STUN server;

determining whether packet header information of the third probe reply matches packet header information of the second probe reply; and determining that the number of NATs in a network path is equal to the updated probe timeout counter in response to determining that the packet header information of the third probe reply matches the packet header information of the second probe reply.

18. The non-transitory processor readable medium of claim 15, wherein the stored processor readable instructions are further configured to cause a processor of a communications device to perform operations comprising determining that a rogue access point is present in the network path in response to determining that the determined number of NATs in the network path does not match a predetermined number of NATs.

19. The non-transitory processor readable medium of claim 15, wherein the packet header information of the first probe reply is a final IP address and port number, and the packet header information of the second probe reply is a second final IP address and port number.

20. The non-transitory processor readable medium of claim 15, wherein the stored processor readable instructions are further configured to cause a processor of a communications device to perform operations comprising initializing the probe timeout counter to zero prior to transmitting the first probe.

21. The non-transitory processor readable medium of claim 15, wherein IP addresses and local ports of multiple computing devices are mapped to the same global IP address and global port of the first NAT.

22. A communications device for, comprising:

means for transmitting a first probe addressed to a Simple Traversal Utilities for NATs (STUN) server via a network connection to a first Network Address Translator (NAT);

means for receiving a first probe reply from the STUN server;

means for incrementing a probe timeout counter that indicates a number of NATs along a network traffic path that a probe will traverse before being dropped;

means for transmitting a first test probe including the incremented probe timeout counter in packet header information of the first test probe via the network connection, the first test probe causing each of the number of NATs indicated by the incremented probe timeout counter to maintain an active address translation mapping for the communications device;

means for transmitting a second probe addressed to the STUN server via the network connection;

means for receiving a second probe reply from the STUN server;

means for determining whether packet header information of the first probe reply matches packet header information of the second probe reply; and means for determining that the number of NATs in a network path is equal to the incremented probe timeout counter in response to determining that the packet header information of the first probe reply matches the packet header information of the second probe reply.

23. The communications device of claim 22, further comprising:

means for incrementing the incremented probe timeout counter to produce an updated probe timeout counter in response to determining that the packet header information of the first probe reply does not match the packet header information of the second probe reply;

means for transmitting a second test probe including the updated probe timeout counter in packet header information of the second probe via the network connection, the second test probe causing each of the number of NATs indicated by the updated probe timeout counter to maintain an active address translation mapping for the communications device;

means for transmitting a third probe addressed to the STUN server via the network connection;

means for receiving a third probe reply from the STUN server;

means for determining whether packet header information of the third probe reply matches packet header information of the second probe reply; and means for determining that the number of NATs in a network path is equal to the updated probe timeout counter in response to determining that the packet header information of the third probe reply matches the packet header information of the second probe reply.

24. The communications device of claim 22, further comprising means for determining that a rogue access point is present in the network path in response to determining that the determined number of NATs in the network path does not match a predetermined number of NATs.

25. The communications device of claim 22, wherein the packet header information of the first probe reply is a final IP address and port number, and the packet header information the second probe reply is a second final IP address and port number.

26. The communications device of claim 22, further comprising means for initializing the probe timeout counter to zero prior to transmitting the first probe.

* * * * *